United States Patent [19]
Rondeau et al.

[11] Patent Number: 6,006,099
[45] Date of Patent: Dec. 21, 1999

[54] SYSTEM AND METHOD FOR PRIVATE RADIO COMMUNICATION

[75] Inventors: Michael N. Rondeau, Forest; William J. Roderique, Lynchburg, both of Va.; Timothy J. Doiron, Wildwood, Mo.

[73] Assignee: Ericsson Inc. Research, Triangle Park, N.C.

[21] Appl. No.: 08/889,898

[22] Filed: Jul. 8, 1997

[51] Int. Cl.$^6$ ................................ H04J 3/12; H04Q 7/00
[52] U.S. Cl. ................ 455/462; 455/466; 455/426; 379/59
[58] Field of Search ...................... 455/462, 466, 455/468, 403, 422

[56] References Cited

U.S. PATENT DOCUMENTS

| | | | |
|---|---|---|---|
| 4,748,685 | 5/1988 | Rozanski et al. | 455/218 |
| 5,404,392 | 4/1995 | Miller et al. | 379/60 |
| 5,526,401 | 6/1996 | Roach et al. | 379/59 |
| 5,594,740 | 1/1997 | LaDue | 379/59 |
| 5,613,201 | 3/1997 | Alford et al. | 455/331 |
| 5,657,317 | 8/1997 | Mahany et al. | 370/338 |
| 5,854,985 | 12/1998 | Sainton et al. | 455/553 |

*Primary Examiner*—David R. Hudspeth
*Assistant Examiner*—Vijay B. Chawan
*Attorney, Agent, or Firm*—Jenkens & Gilchrist

[57] ABSTRACT

An improved private radio communication system and method for routing data signals to multiple remote devices connected to a common remote receiver and for routing data signals to applications both within the remote devices and within the common remote receiver is disclosed.

15 Claims, 2 Drawing Sheets

SYSTEM AND METHOD FOR PRIVATE RADIO COMMUNICATION

BACKGROUND OF THE INVENTION

1. Field of the Invention

The present invention relates generally to radio frequency (rf) communication systems, such as a two-way, multi-user private radio system, particularly to a communication system and method for routing signals to multiple remote devices connected to a remote receiving device.

2. Background and Objects of the Invention

In private radio systems such as conventional land mobile radio (LMR) systems, multiple radio transceivers, including for example portable radio units and mobile radio units, initiate and carry on communications over a preselected radio frequency channel, typically via a base station repeater. Land mobile radios are particularly used by police and fire departments, rescue workers, paramedics, power and telephone company field technicians, municipalities, and other mobile groups that require immediate communication with other members of their respective group. Communication between the various members can include visual information, which may be displayed on a mobile data terminal (MDT). For example, a police officer on patrol can request and receive information from a base or host computer about a stopped motorist, which is displayed on an MDT in the patrol car.

With reference now to FIG. 1 of the drawings, there is illustrated a conventional private radio communication system, generally designated with the reference numeral 10, employing a conventional protocol. In particular, a Transmitting Data Terminal (TDT) 12, e.g., an MDT, is connected to a Data Originating Mobile (DOM) radio 14, e.g., a first private radio device via a wireline communications link 16, e.g., an RS232 link. The DOM 14 includes an antenna 14A for transceiving rf messages, e.g., transmitting a data message from the TDT 12 (via link 16) over an rf channel to a base station repeater (RPT) 18, which receives and transmits the message via an antenna 18A. The forwarded data message is then sent to a Data Receiving Device 20 (DRM) through an antenna 20A and forwarded across another wireline communications link 22 to a Receiving Data Terminal (RDT) 24, e.g., another MDT.

The conventional protocol used in the aforementioned communications link between the TDT 12 and the RDT 24, discussed in more detail hereinafter, however, allows data to be transmitted to only one such RDT device 24 attached to the DRM 20, e.g., the other MDT. There is no provision in the conventional system and protocol shown in FIG. 1 for routing the data message to other attached devices, e.g., a printer (not shown) also attached to the DRM 20. Further, there is no provision for routing the data message to the DRM 20 itself, e.g., to a diagnostic or other application residing therein. Additionally, the conventional system 10 and protocol do not provide for multiple RDT 24 addressing, i.e., to applications therein.

It is, therefore, an object of the present invention to provide a private radio communication system and method for a first user to forward a data message to at least one of multiple remote devices attached to the DRM 20.

It is also an object of the present invention to provide a communication system and method for the first user to forward the data message to applications stored within remote devices such as the DRM 20 and RDT 24.

SUMMARY OF THE INVENTION

The present invention advantageously provides an improved private radio communication method, and associated system, for routing data signals to multiple remote devices connected to a common remote receiver, and for routing data signals to applications both within the remote devices and within the common remote receiver.

A more complete appreciation of the present invention and the scope thereof can be obtained from the accompanying drawings which are briefly summarized below, in the following detailed description of the presently-preferred embodiments of the invention and in the appended claims.

DETAILED DESCRIPTION OF THE PREFERRED EXEMPLARY EMBODIMENTS OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
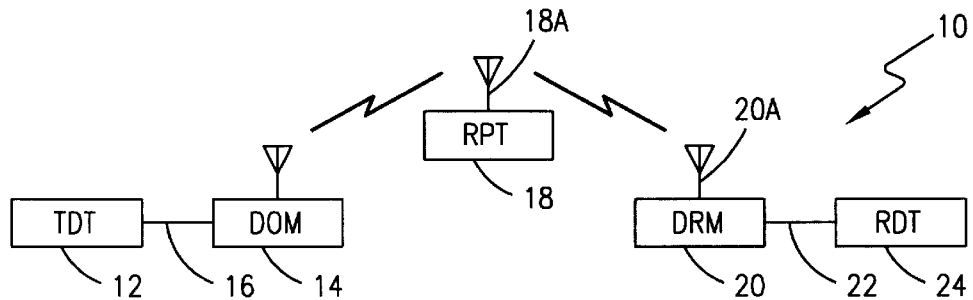
FIG. 1 illustrates a functional block diagram of a conventional private radio system.
Figure 2:
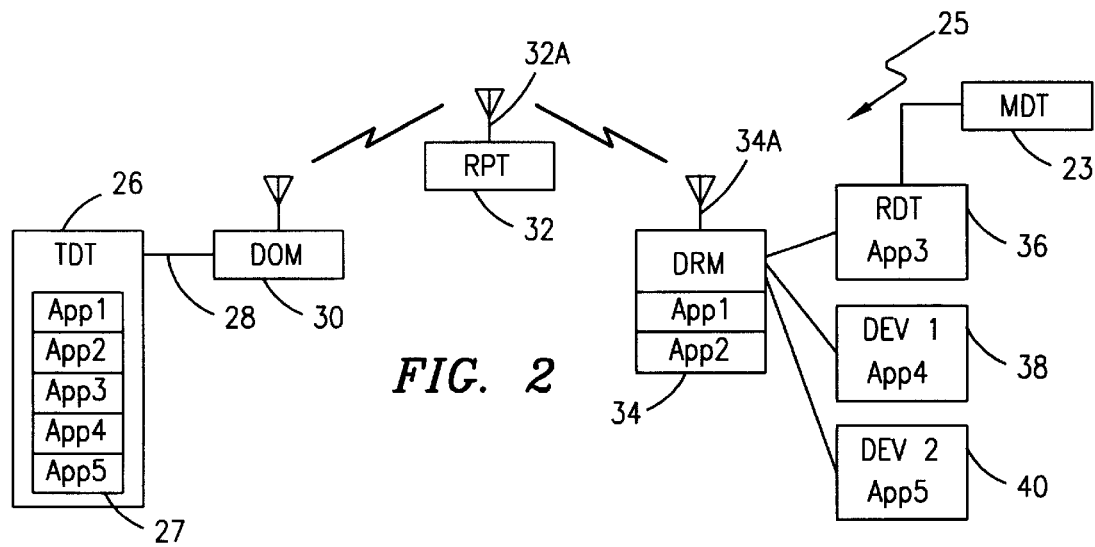
FIG. 2 illustrates a functional block diagram of a private radio system in accordance with an embodiment of the present invention.

With reference now to FIG. 2 there is illustrated an improved private radio communication system, generally designated by the reference numeral 25, in accordance with the present invention. As with the conventional system 10 illustrated in FIG. 1, a user at a TDT 26 forwards a data message (over a wireline link 28) to a DOM 30. An rf signal z, corresponding to the data message is then transmitted from an antenna 30A to an RPT 32 which relays the message to another DRM 34, as described in connection with system 10. Instead of a single device, i.e., the RDT 24 attached to the DRM 20 in FIG. 1, however, multiple devices are attached to the DRM 34 in accordance with the preferred embodiment of the present invention, including an RDT 36 and a first and second peripheral devices 38 and 40, respectively, described further herein.

With further reference to FIG. 2, five separate data messages, bearing the respective address labels App 1 to App 5, are shown queued in a message queue 27 within the TDT 26 for transmission to the corresponding respective remote devices. For example, App 1 and App 2, destined for internal usage within the DRM 34, are addressed accordingly. Similarly, App 3 is destined for usage within the RDT 36, and App 4 and App 5 are destined for remote devices 38 and 40, respectively. In this manner a variety of data messages may be queued and forwarded to a variety of remote components and applications both within the remote receiver 34 and devices 36, 38 and 40 attached thereto, as will be discussed in more detail hereinafter.

In a particular embodiment of the present invention, employing Enhanced Digital Access Communication System (EDACS) technology with Data Channel Signaling (DCS) protocol, conventional commands utilized in forwarding the data messages in the conventional system 10 of FIG. 1 utilize a five-bit command field. In the field, one of the bits is set to logical zero for most commands and is ignored by conventional EDACS radios 14 and 20 and base station repeaters 18. The present invention is directed toward extending the DCS protocol to a true five-bit command, utilizing this unused bit, and expanding the capability of the system 10 shown in FIG. 1 by also setting this bit to logical one instead of the default zero.

Figure 3:
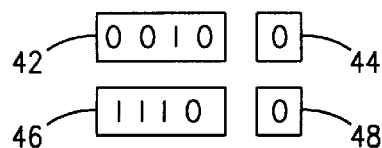
FIG. 3 illustrates a data command utilized by the conventional private radio system shown in FIG. 1.

With reference now to FIG. 3, there is illustrated the bit structure of the aforedescribed command field utilized in the conventional system 10 of FIG. 1. As shown in FIG. 3, the data message sent from the DOM 14 to the DRM 20 includes the four-bit field "0010," designated by the reference numeral 42, and the adjacent, unused bit "0" is designated by reference numeral 44. As is understood in the art, when the DRM 20 receives the message 42, the DRM 20 transmits an acknowledgement signal back to the DOM 14, indicating the successful transmission of the relevant data. An acknowledgment signal field 46 includes the command bit field "1110." As with the command field 42, adjacent the acknowledgment signal 46 is an unused bit field 48 also set to logical zero in the conventional system 10 of FIG. 1.

It should be understood that the improved system 25 of the present invention preferably incorporates the same command structures utilized by the conventional system 10 in order to be as backward-compatible as possible with existing equipment. In addition, new commands are employed through utilization of the unused bit fields 44 and 48. Accordingly, the DRM 20 of the improved system 25, upon receiving an "old" command, i.e., one where the unused bit field 44 is logical zero, will forward the data message associated with the old command directly to the attached RDT 24 in accordance with conventional operations and acknowledge receipt of the message with an "old" acknowledgment signal, i.e., one where the unused bit 48 is logical zero, emulating the conventional message exchange procedures of system 10.

Figure 4:
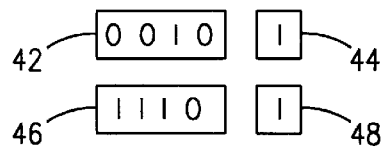
FIG. 4 illustrates a data command utilized by the private radio system of the present invention as shown in FIG. 2.

As shown in FIG. 4, new commands are possible through utilization of the "unused" bits 44 and 48. In accordance with the improved system 25 and message designation method of the present invention, receiver 34 routes an incoming data message either internally or externally pursuant to an address associated with the command. For example, if the incoming data is addressed for internal usage within the DRM 34 (App 1 or 2), internal radio parameters, such as modifying the frequency list, may be changed, the data message may invoke a debugging tool to set or examine a memory location within the radio receiver 34 or other such internal diagnostics or modifications. Alternatively, the receiver 34 in accordance with the present invention may forward the incoming data to an external application (App 3, 4 or 5) located within the respective external devices 36, 38 or 40 attached to the radio receiver 34. In particular, external devices 38 and 40 may be attached to a control head network of the receiver 34. For example, a text message may be received by the receiver 34 and forwarded to an MDT 23 attached to the RDT 36 or to the radio control head within the receiver 34 for such purpose as a pager or text messenger (App 1 or App 2), or a data message may be sent to a printer (DEV 1) or an Automatic Vehicle Location (AVL) receiver (DEV 2), corresponding to external devices 38 and 40, respectively.

It should therefore be understood from the above description that a system 25 employing the enhanced command features of the present invention can accommodate both old and new commands. For example, if the radio receiver (DRM) 34 receives a data message with the bit field 44 set, the receiver 34 may not only forward the message on to the appropriate destination, e.g., a printer (remote device 38), but will acknowledge receipt of the data message by responding with the appropriate acknowledgment signal employing an acknowledgment command with the bit field 48 set, as shown in FIG. 4. The DOM 30 receiving such an acknowledgment signal would, accordingly, recognize the receiver 34 as an enhanced device operating in accordance with the system and method of the present invention. However, if the DOM 30 receives an acknowledgment signal where the bit field 48 is zero, as shown in FIG. 3, this indicates that the receiver 34 is part of the old system 10 and no enhanced data message capability is possible. The DOM 30 may then report an error to the TDT 12 and abort the data call.

To provide the requisite device and application addressing for forwarding the aforementioned radio data signals to the appropriate destinations, the aforementioned DCS protocol of the conventional system 10 is further modified. In particular, an extension field associated with the incoming data signal in system 10 contains the pertinent extensions for the data transference, i.e., the destination and source logical identification (LID) numbers for the DRM 20 and DOM 14, respectively. It should nevertheless be understood by one skilled in this art that such addressing is redundant in that both of the radios 14 and 20 have already received the pertinent source and destination LIDs during channel assignment from the control channel (not shown). In particular, the source and destination fields containing the respective LIDs in the DCS protocol for system 10 each contain 14 bits, allowing 16,383 unique radio LIDs (logical zero not being an option). In the DCS protocol utilized in connection with system 25, however, at least one of these fields, e.g., the destination field, is divided into a command subfield and a device address subfield where the command subfield is 4 bits in length (designating up to 16 different commands) and the device address subfield is 12 bits, providing up to 4,095 unique device addresses.

It should be understood that the number of internal applications and external radio devices shown in FIG. 2 are exemplary only and other numbers of external devices and internal applications are possible. For example, the number of external devices is a function of the control head network and the number of internal applications is determined by the aforementioned command subfield and the address subfield. Further, the number of RDT 36 applications is not restricted to one, as in FIG. 2, but is preferably instead application dependent and a function of the application header attached to the data message sent to the RDT 36. In other words, the data message forwarded to the RDT 36 may be so divided into a header portion and a data portion, where the RDT 36 uses the header to determine which internal application (within the RDT 36 itself) to send the data portion. Also, messages forwarded to the RDT 36 may be Internet Protocol (IP) datagrams which are directed out of the MDT 23 onto an intranet or to the Internet.

Figure 5:
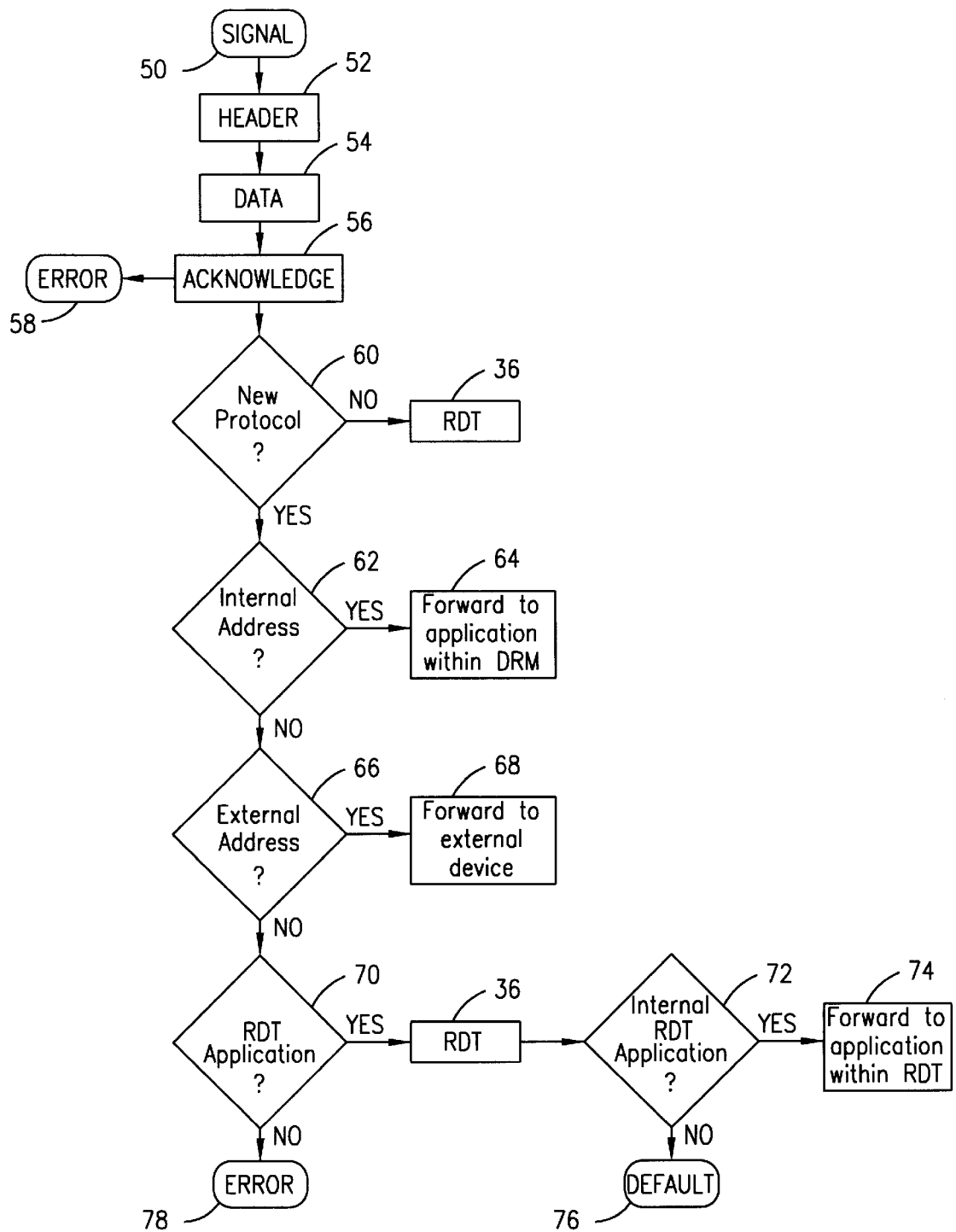
FIG. 5 is a flowchart illustrating the operations of the private radio system of FIG. 2 in accordance with the present invention.

With reference now to FIG. 5, there is shown a flow chart illustrating steps in practicing the method of the present invention, in which an incoming data signal 50 to the DRM 20 may be divided into a header portion (box 52) and a data portion (box 54). The receiver 34 examines the header and data message portions of the incoming signal and forwards an acknowledgement (box 56). If either the header or data message portions or aspects of the signaling is in error, an error message (box 58) is forwarded back to the DOM 30 instead.

If the incoming data signal is from a conventional DOM 14 (box 60), ice., the bit 44 is zero, then the incoming data signal is forwarded as if it were a conventional signal such as forwarded within system 10, i.e., it is sent to the RDT 36. If, however, the incoming data signal is from a DOM 30 in accordance with the present invention, i e., the incoming bit 44 is set, then further analysis of the new protocol is required. If the data signal indicates an internal address (box 62), i.e., within the DRM 34 itself (App 1 or App 2), then the signal is forwarded accordingly using the aforementioned address subfield (box 64). If the data signal instead indicates an external address (box 66), e.g., App 4 in external device 38 or App 5 in external device 40, then the signal is forwarded to the respective device (box 68) and processed accordingly. If the data signal instead indicates an RDT application (box 70), e.g., the MDT 23 attached to or App 3 within RDT 36, as shown in FIG. 5 for further processing. If the incoming signal is an internal RDT application (box 72), i.e., App 3, the signal is forwarded to the respective application (box 74). Otherwise the signal may be forwarded to a default device (box 76), such as the MDT 23, attached to the RDT 36, as is conventionally done in system 10. Finally, if the DRM 34 fails to categorize the new protocol signal in boxes 62, 66 and 70, an error condition (box 78) is indicated, and an error message is forwarded back to the DOM 30. It should be understood that additional error condition messages, e.g., within the RDT 36, may also be identified and forwarded back to the DOM 30.

It should be understood that although the preferred embodiment of the present invention utilizes a base station repeater (RPT) 32 to centralize communications between the various users of the system 25, e.g., in a trunked communications system, the scope of the present invention encompasses systems operating without such an intermediary RPT 32, i.e., in conventional mode.

It should also be understood that the data signals transferred in accordance with the present invention preferably include non-voice data, e.g., text, video images and the like. Further, it should be understood that AVL functionality may also be implemented internally, i, within the DRM 34 (such as APP 1).

While the invention has been described herein in :Me connection with preferred embodiments thereof, it is to be understood that the scope of the invention is not limited to its described embodiments, but is intended to encompass various modifications and equivalents within the spirit and scope of the appended claims.

What is claimed is:

1. A private radio system for communications between a multiplicity of users, said private radio system comprising:
    a first radio transceiver for use by a first of said multiplicity of users;
    a second radio transceiver for use by a second of said multiplicity of users, said first radio transceiver transmitting and said second radio transceiver receiving a data signal from said first user, said data signal including addressing means therein for addressing said data signal to a multiplicity of applications, said data signal corresponding to at least one of said applications;
    a plurality of external devices connected to said second radio transceiver, said addressing means addressing said data signal to at least one of a given one of said applications within said second radio transceiver and a given one of said applications located on a respective one of said external devices;
    said data signal further coded in an enhanced Data Channel Signaling (DCS) protocol, wherein said enhanced DCS also incorporates command structures compatible with existing equipment; and
    said second radio transceiver further for acknowledging receipt of said data messages to said first radio transceiver, wherein said first radio transceiver detecting from said acknowledgment if said acknowledging second radio transceiver is compatible with said enhanced DCS protocol.

2. The private radio system according to claim 1, wherein said data signal includes text data and video images.

3. The private radio system according to claim 1, wherein one of said external devices is a receiving data terminal, said given application located within said receiving data terminal.

4. The private radio system according to claim 1, wherein at least one of said external devices is a printer.

5. The private radio system according to claim 1, wherein at least one of said external devices is an automatic vehicle location receiver.

6. The private radio system according to claim 1, wherein said given one application within said second radio transceiver is an automatic vehicle location receiver.

7. The private radio system according to claim 1, wherein said addressing means comprises a command field and an address field within said data signal, said command and address fields being associated with a given data record within said data signal, said command field including a command and said address field including an address for routing said data record to a given one of said applications.

8. The private radio system according to claim 1, further comprising:
    a base station repeater for receiving said data signal transmitted by said first radio transceiver and forwarding said data signal to said second radio transceiver.

9. The private radio system according to claim 1, wherein said first radio transceiver comprises a queuing means for queuing a plurality of data messages therein, a respective one of said data messages corresponding to said data signal transmitted by said first radio transceiver.

10. A method for data transference between a multiplicity of users in a private radio system, said method comprising the steps of:
    transmitting, by a first user within said private radio system a data signal in an enhanced Data Channel signaling (DCS) protocol;
    receiving, by a second user at a transceiver, said data signal including an address and a command therein to at least one application, wherein said enhanced DCS data signal also incorporating command structures compatible with existing equipment;
    routing said data signal, within said transceiver, to a destination device attached to said transceiver and corresponding to said address, said data signal being addressed to at least one of a multiplicity of applications attached to said transceiver, said at least one application being located on said destination device; and
    acknowledging receipt of said data signal, said acknowledgment indicating if said receiving transceiver is compatible with said enhanced DCS protocol.

11. The method according to claim 10, wherein said destination device in said step of routing is the receiver.

12. The method according to claim 10, wherein said destination device in said step of routing is an external device.

13. The method according to claim 10, wherein said destination device is a receiving data terminal.

14. A private radio system for communications between a multiplicity of users, said private radio system comprising:

a transmitting data terminal (TDT) for transceiving data messages;

a data originating mobile radio (DOM), said DOM connected to said TDT via a wireline communication link, said DOM for transceiving data messages over an rf channel to a base station repeater;

said base station repeater forwarding data messages over an rf channel to a data receiving mobile (DRM), said DRM for transmitting data messages via a wireline communication link to a receiving data terminal (RDT) and a plurality of remote devices;

an addressing means associated with said TDT for addressing said data messages to applications within said DRM, said RDT and said plurality of remote devices employing an enhanced Data Channel Signaling (DCS) protocol;

said DRM compatible with conventional data messages sent from existing equipment, wherein said DRM forwarding said conventional data messages to said RDT; and said DRM further for acknowledging receipt of said data messages to said DOM via said base station repeater, wherein said DOM detecting from said acknowledgment if said acknowledging DRM is compatible with said enhanced DCS.

15. The private radio system according to claim 14, wherein said data messages include text messages and video images.

* * * * *

UNITED STATES PATENT AND TRADEMARK OFFICE
CERTIFICATE OF CORRECTION

PATENT NO. : 6,006,099
DATED : Dec. 21, 1999
INVENTOR(S) : Michael N. Rondeau et al.

It is certified that error appears in the above-identified patent and that said Letters Patent is hereby corrected as shown below:

| | |
|---|---|
| Column 2, line 46 | Delete "z," |
| Column 5, line 6 | Replace "ice." With --i.e.-- |
| Column 5, line 10 | Replace "i e." With --i.e.-- |
| Column 5, line 44 | Replace "i." With --i.e.-- |

Signed and Sealed this

Seventeenth Day of April, 2001

Attest:

NICHOLAS P. GODICI

Attesting Officer     Acting Director of the United States Patent and Trademark Office